April 5, 1960 H. GANG 2,931,569

PRODUCT TRANSFER MECHANISM

Filed March 25, 1955 8 Sheets-Sheet 1

INVENTOR
HERMAN GANG

BY George V. Hall
ATTORNEY

April 5, 1960 H. GANG 2,931,569

PRODUCT TRANSFER MECHANISM

Filed March 25, 1955 8 Sheets-Sheet 2

INVENTOR
HERMAN GANG

BY George V. Hall
ATTORNEY

PRODUCT TRANSFER MECHANISM

Filed March 25, 1955

INVENTOR
HERMAN GANG
BY [signature]
ATTORNEY

April 5, 1960 H. GANG 2,931,569

PRODUCT TRANSFER MECHANISM

Filed March 25, 1955 8 Sheets-Sheet 4

INVENTOR
HERMAN GANG

BY George V. Hall
ATTORNEY

April 5, 1960 H. GANG 2,931,569

PRODUCT TRANSFER MECHANISM

Filed March 25, 1955 8 Sheets-Sheet 5

INVENTOR
HERMAN GANG

BY George V. Hall
ATTORNEY

April 5, 1960 H. GANG 2,931,569

PRODUCT TRANSFER MECHANISM

Filed March 25, 1955 8 Sheets-Sheet 6

INVENTOR
HERMAN GANG

BY George V. Hall
ATTORNEY

April 5, 1960 H. GANG 2,931,569

PRODUCT TRANSFER MECHANISM

Filed March 25, 1955

8 Sheets-Sheet 7

INVENTOR
HERMAN GANG

BY George W. Hall
ATTORNEY

April 5, 1960 H. GANG 2,931,569

PRODUCT TRANSFER MECHANISM

Filed March 25, 1955

8 Sheets-Sheet 8

INVENTOR
HERMAN GANG

BY George B. Hall
ATTORNEY

United States Patent Office 2,931,569

Patented Apr. 5, 1960

2,931,569

PRODUCT TRANSFER MECHANISM

Herman Gang, Livingston, N.J., assignor to Monroe Calculating Machine Company, Orange, N.J., a corporation of Delaware Application March 25, 1955, Serial No. 496,642

6 Claims. (Cl. 235—63)

This invention relates to means automatically operable to transfer a value from the product register of a calculating machine to a series of multiplier storage devices and, furthermore, to initiate a program of multiplication using the transferred value as a multiplier.

Applicant's Patent No. 2,531,208 discloses a calculating machine wherein a value may be transferred from a product register to a series of multiplier storage devices for the control of a subsequent multiplying operation. However, certain of a sequence of operations must be performed manually, i.e., the storage devices must be adjusted from a normal position to a value receiving position with respect to the product register, a zero setting operation of the product register must be initiated thereby transferring the value registered therein to the storage devices and instituting a shift of the product register carriage to the proper position for the multiplying operation, and then the multiplying operation must be initiated.

The automatically operable means of a preferred embodiment of the present invention is adapted to perform the aforenoted manual operations in response to the single depression of a key in a machine otherwise operating in accordance with the aforenoted Patent No. 2,531,208. This patent, however, does not fully disclose the means for initiating the multiplying operation and reference is made to applicant's Patent No. 2,531,207 for a complete disclosure of this operation. The automatically operable means of the invention includes a multiphase clutch which is engaged upon depression of the key to control certain novel mechanisms cooperatively associated with certain of the basic mechanisms disclosed in the aforenoted patents to effect the product transfer and subsequently to initiate the program of multiplication.

In the following description of a preferred embodiment of the invention with reference to the accompanying drawings, parts equivalent to parts of the aforenoted patents are identified by like reference numerals. Reference is made to these patents for a complete disclosure of mechanisms and operations herein referred to but not disclosed in detail.

*Registering mechanism*

Figure 1:
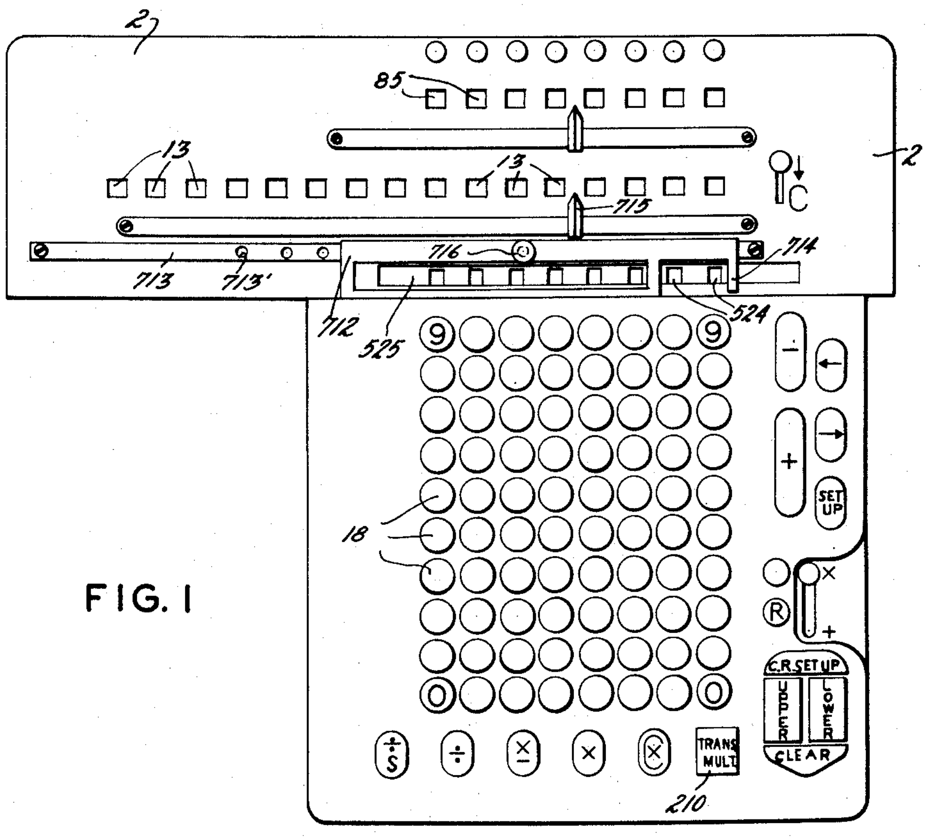
Fig. 1 is a plan view of a calculating machine embodying the invention.

The product register comprises an ordinal series of numeral wheels 13 (Figs. 1 and 5) mounted in main carriage 2 which is denominationally shiftable on the fixed frame of the machine. Additive or subtractive registration is effected by reversible rotary digital actuators 5 and tens-transfer actuators 17. Digital actuators 5 are each differentially settable upon depression of any one of a series of digital value keys 18 of an associated row of the keyboard in accordance with the value of the depressed key. The actuating mechanism is rotated forwardly or reversely to effect additive or subtractive registration by a differential planetary drive transmission (Fig. 2) through a normally engaged friction clutch 352 (Fig. 3).

A gear 105 and a spider 110 comprise legs of the differential drive transmission and normally are rotated idly in opposite directions by the motor drive. A clutch lever 111 operable in association with gear 105 and spider 110 controls the differential drive to effect the additive or subtractive operation of the actuating mechanism. Counterclockwise movement (Fig. 2) of clutch lever 111 from a neutral intermediate position is adapted to arrest rotation of gear 105 thereby causing the output of the differential drive to effect additive drive to the actuating mechanism. Conversely, clockwise movement of clutch lever 111 will arrest rotation of spider 110 thereby causing the differential drive to effect reverse or subtractive operation of the actuating mechanism. Digital actuators 5 and tens-transfer actuators 17 transmit drive to register wheels 13 through intermediate gears 545 in the base of the machine and intermediate gears 544 in the main carriage.

*Carriage shifting mechanism*

The drive for the carriage shifting mechanism (Fig. 3) comprises the reversible differential planetary transmission (Fig. 2) described in connection with the registering mechanism. The drive from the differential transmission to the carriage shifting mechanism is effected through a normally disengaged friction clutch 353 which is engaged upon disengagement of friction clutch 352 for the register drive. The driving member of friction clutch 353 is connected by a sleeve with the driving member of the normally engaged registration friction clutch 352. Upon initiation of a carriage shifting operation, clutch lever 111 is moved to its additive setting to transmit power through the planetary transmission for a right carriage shift and to its subtractive setting to transmit power for a left carriage shift; and concurrently means is operable to adjust the sleeve connecting the driving members of friction clutches 352, 353 to disconnect clutch 352 for the registration drive and to connect friction clutch 353 for the carriage shifting drive.

Means for controlling the adjustment of friction clutches 352, 353 comprises a normally set toggle 362 (Figs. 3, 5 and 6) which controls adjustment of the connecting sleeve to hold clutch 352 normally in engaged position and clutch 353 in disengaged position. In the initiation of a carriage shifting operation, a shaft 365 is rocked clockwise to engage a finger 366 mounted thereon with a lug of toggle 362 thereby breaking said toggle to adjust the connecting sleeve to disengage clutch 352 and to engage clutch 353. Simultaneously with this operation, means is provided to move clutch lever 111 (Fig. 2) from its intermediate position to control the direction of the carriage shift as hereinafter described in connection with the devices of the invention. Power for the shifting operation is transmitted through engaged friction clutch 353 to a shift worm 358 which is engaged by plunger 359 extending downwardly from the rear of the carriage.

Upon initiation of the carriage shifting operation, a two phase auxiliary shift control clutch 371 (Fig. 4) is engaged for its first phase of operation. The first phase of operation of this auxiliary clutch effects certain adjustments incidental to the shifting operation including operation of means for raising the forward edge of the carriage to disengage the intermediate register drive gears in the carriage from the intermediate drive gears in the base of the machine.

Upon movement of shaft 365 and finger 366 to restored position, the carriage shifting operation will be terminated at the end of the current cycle of operation. Means is provided to restore shaft 365 and finger 366 upon movement of the register carriage 2 into either of its end positions, or these parts may be restored as hereinafter described in connection with the devices of the invention. Restoration of shaft 365 and finger 366 permits engagement of auxiliary clutch 371 for its second phase of operation. This operation of the clutch resets toggle 362 thereby disengaging shift friction clutch 353 and reengaging registration friction clutch 352 and also moves clutch lever 111 to its normal intermediate position thereby disconnecting the planetary drive transmission.

*Zero setting of the product register*

A single cycle clutch 464 (Fig. 4) is selectively operable to reset product register wheels 13 and wheels 85 (Figs. 1 and 5) of a counter register to zero position. Furthermore, the clutch is selectively operable to release any of the keys 18 of the keyboard which may be in depressed latched position. The devices of the invention, however, are not operatively related to the keyboard clearing operation. A slide 477 (Fig. 6) is operable to engage clutch 464 for a single cycle of operation and to connect a power transmission train including a rock shaft 507 (Fig. 5) to effect the resetting operation for wheels 85 of the counter register. A slide 479 is operable to engage the clutch and to engage a transmission train including a rock shaft 513 for a resetting operation for the product wheels 13. Slides 477, 479 may be simultaneously operated so that a single cycle of operation of the clutch will simultaneously effect a resetting operation for both the counter register and for the product register.

Clutch 464 is of well-known construction in which a spring urged pawl mounted on the driven member of the clutch is held out of engagement with the driving member by a detent 487. Detent 487 is normally held in clockwise clutch disengaging position by a suitable latching arrangement which is released upon operation of slide 477 and/or 479. Upon release of the latching means detent 487 is spring rocked counterclockwise from the position shown in Figure 4 to engage clutch 464 for a single cycle of operation.

Suitable interlock means is provided to prevent clutch lever 111 (Figs. 2 and 4) of the machine drive transmission from being moved from neutral to drive engaging position during operation of clutch 464. Conversely the interlock means is operable to prevent engagement of clutch 464 while clutch lever 111 is in drive engaging position. The interlock means comprises an arm 488 which is fixed for rocking movement with detent 487. Arm 488 terminates in a forked end which, upon counterclockwise movement of detent 487 to engage clutch 464, clutch engages a pin 489 on clutch lever 111 thereby locking said lever in neutral position. When detent 487 is in clockwise clutch disengaging position (Fig. 4) the forked end of arm 488 is positioned a slight distance below pin 489. When clutch lever 111 is moved clockwise or counterclockwise from the neutral position shown in Figures 2 and 4 to drive engaging position, pin 489 will be moved in position to be engaged by one or the other sides respectively of the forked end of interlock arm 488 thereby blocking counterclockwise movement of said arm and to prevent movement of detent 487 to engage clutch 464. As will be hereinafter described in connection with the devices of the invention, clutch lever 111 may be spring biased toward one or the other of its effective positions during operation of clutch 464, and the operation of the spring biasing means will be held in abeyance until the end of the cycle of operation of clutch 464. Conversely, detent 487 may be released from the latch restraining means while clutch lever 111 is in effective position, and engagement of clutch 464 will be held in abeyance until clutch lever 111 is moved to neutral drive disengaging position.

*Multiplier storage devices*

The multiplier storage devices are mounted in a subcarriage 525 (Figs. 1, 5, 16 and 17) which is slidably mounted on a splined shaft 527 which extends longitudinally within the front of main carriage 2. The subcarriage is thus adapted for longitudinal movement relative to the main carriage. At the right end of subcarriage 525 is a pivotally mounted latch 530 which is spring biased into engagement with a plate 531 at the right end of main carriage 2 thereby normally holding said subcarriage in its rightmost position (Fig. 16) within the main carriage. Plate 531 further operates in connection with value entering mechanism which is operable to enter a value set on keys 18 of the keyboard into the multiplier storage devices. This operation, however, forms no part of the present invention. In the aforenoted Patent No. 2,531,208 latch 530 is manually controlled in the product transfer operation disclosed therein. However, as hereinafter disclosed, the devices of the present invention provide automatic means for effecting control of said latch.

Figures 16, 17:
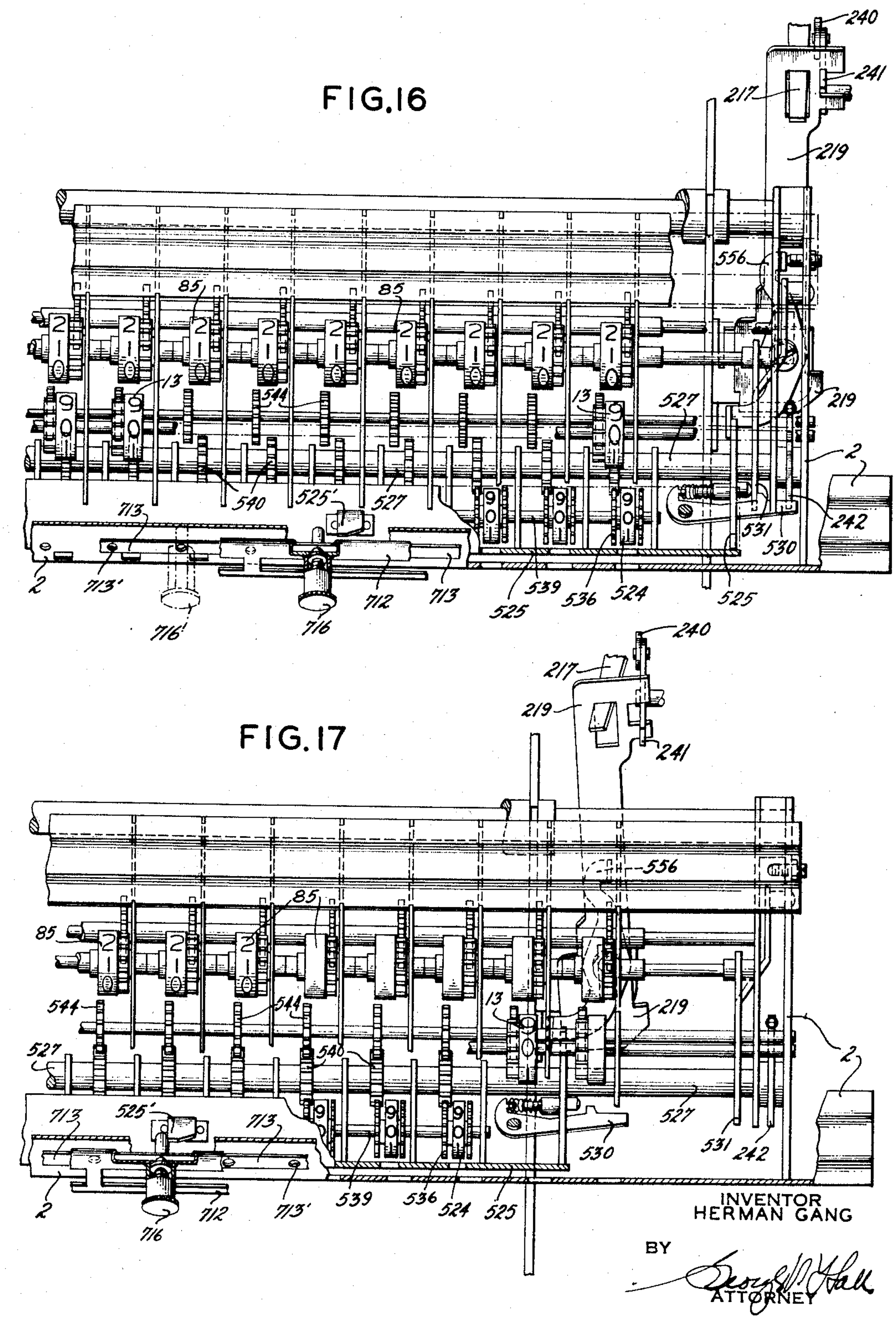
Fig. 16 is a fragmentary plan view with sub-carriage in normal locked position.
Fig. 17 is a fragmentary plan view with sub-carriage unlatched and blocked, and the main carriage shifted to effect relative adjustment between the carriages for the transfer operation.

Release of latch 530 from engagement with plate 531 will permit longitudinal movement of subcarriage 525 toward the left relative to main carriage 2 as shown in Figure 16 if said main carriage is shifted from its left end position. However, when main carriage 2 is in its left end position (Figs. 1 and 16), a lock lever 556 prevents subcarriage 525 from being moved from its normal position within main carriage 2. Lock lever 556 is pivotally mounted on the fixed framing of the machine and a rearwardly extending arm thereof is provided with an upstanding lug which, as the main carriage is shifted into its left end position, will be engaged by a stud extending inwardly from the right end plate of said carriage. Thus, the forward end of lever 556 will be urged and held toward the right when carriage 2 is shifted into its left end position. With the parts in this position, an upstanding ear at the forward end of lever 556 engages the inner face of the right end plate of subcarriage 525 thereby preventing said subcarriage 525 from being moved toward the left longitudinally within the main carriage. However, when the main carriage is shifted toward the right (Fig. 17), the ear of lock lever 556 will permit movement of the subcarriage toward the left relative to said main carriage upon release of latch 530.

Figure 6:
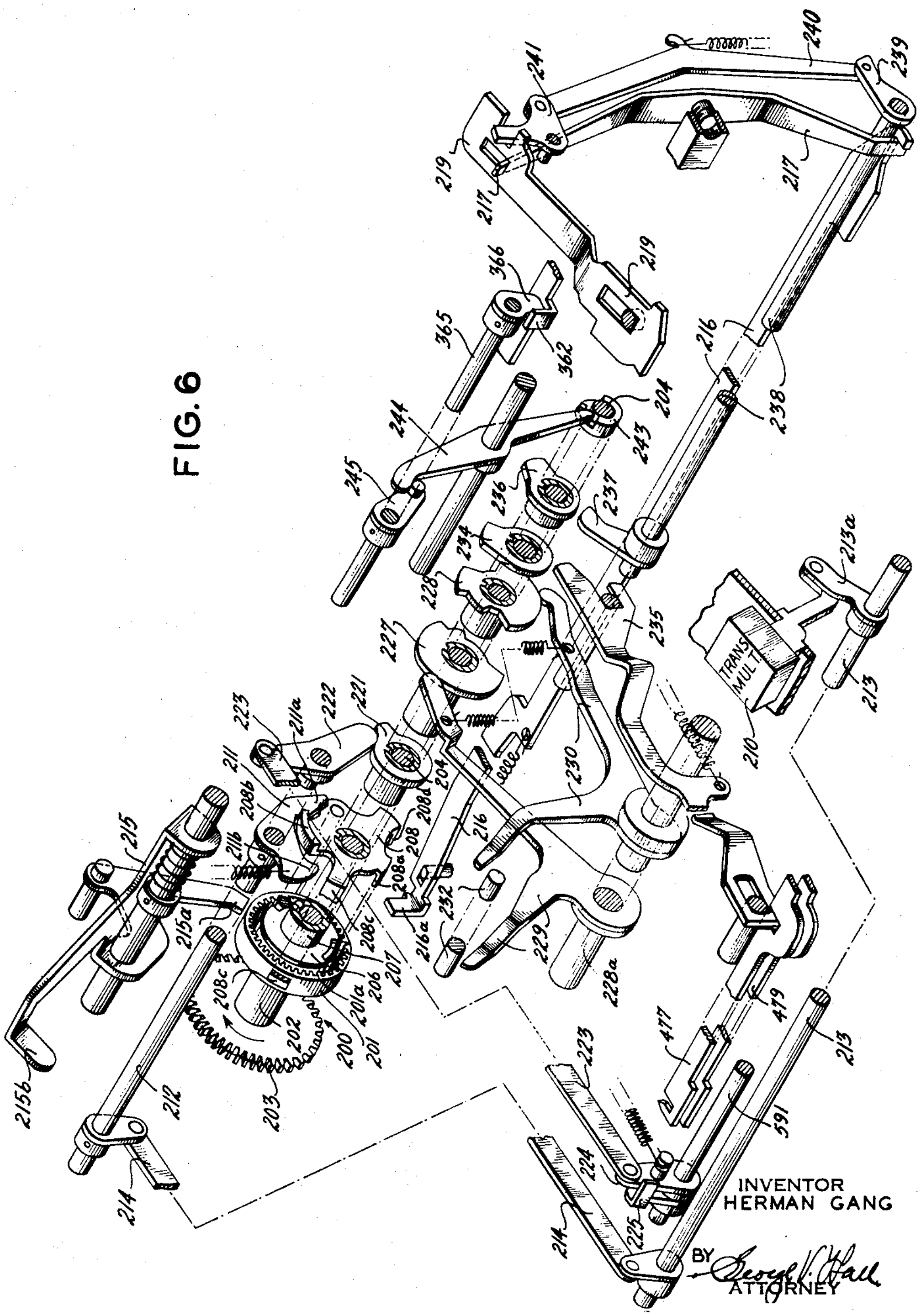
Fig. 6 is an exploded perspective of the control devices of the invention and the multiphase drive clutch therefor.

As will be hereinafter described, a product transfer is effected with the main carriage shifted to the right from its left end position and the subcarriage shifted toward the left relative to said main carriage. After the transfer operation, main carriage 2 will be shifted back to its left end position for the subsequent multiplying operation which is initiated upon the rocking of a shaft 591 (Figs. 2 and 6). Upon movement of carriage 2 into the left end position, the lug at the rear of lock lever 556 will be reengaged by the stud on the end plate of said carriage and the nose at the front end of said lever will locate the subcarriage for reengagement of latch 530 with plate 531.

The multiplier storage wheels 524 (Figs. 5, 16 and 17) are rotatably mounted on a shaft 539 extending longitudinally at the front of subcarriage 525. Located to the rear of wheels 524 are multiplier storage gears 540 which are in constant engagement with gears 536 fixed for rotation with storage wheels 524. Storage gears 540 are rotatably and slidably mounted on shaft 527 and are thus shiftable longitudinally in the main carriage with subcarriage 525 and the other parts contained therein. In the performance of a program of multiplication, storage gears 540 and associated wheels 524 are successively counted back to zero as subcarriage 525 is denominationally shifted toward the right with main carriage 2. The present invention, however, with relation to the multiplying operation, is concerned only with its initiation.

Normally the multiplier storage gears 540 are located to the right and out of mesh (Fig. 16) with the successive lower order intermediate gears 544 of the product register numeral wheels 13. However, in the product transfer operation hereinafter described, subcarriage 525 is shifted to the left (Fig. 17) relative to main carriage 2 to bring storage gears 540 into a driven engagement with preselected successive orders of intermediate gears 544.

*Adjustment control for the subcarriage*

A manually adjustable slide 712 (Figs. 1, 5, 16 and 17) is mounted on a rail 713 which is fixed on the lower front face of main carriage 2. Slide 712 is held in longitudinally adjusted position by a manually retractible spring urged plunger 716 which is adapted for engagement with one of a series of space holes 713' in rail 713. When plunger 716 is spring urged into engagement with a hole 713' to locate slide 712 in adjusted position, the end of said plunger extends inwardly through the face of main carriage 2. Subcarriage 525 has a lug 525' extending upwardly therefrom and into position to engage the end of plunger 716 and thereby limit the extent of a leftward shift of said subcarriage relative to its normal position within main carriage 2.

A finger 714 extends downwardly from the right upper end of slide 712. When main carriage 2 is in its left end position and slide 712 is adjusted in its rightmost position on said carriage (Fig. 1), finger 714 is positioned to the right of the units order storage wheels 524 and to the right of the units order row of keys 18 of the keyboard. Finger 714 is adapted to serve as a decimal marker and therefore when the parts are in the above adjusted position, a multiplier set in the storage devices and a multiplicand set in the keyboard are considered as whole numbers.

Carriage 2 is shifted toward the right in the performance of a multiplying operation and with carriage 2 in a rightward shifted position, subcarriage 525 may be shifted toward the left as shown in Figure 17 relative to said main carriage 2 under control of the devices of the invention as hereinafter described. It will be recalled that when control slide 712 is in its rightmost adjusted position the multiplier set in the storage devices and the multiplicand set in the keyboard are considered as whole numbers. When the parts are in this position (Figs. 1 and 16), the end of plunger 716 is positioned a distance to the left of lug 525' of subcarriage 525 which will permit said subcarriage to be shifted toward the left in main carriage 2 just sufficiently to engage the units order storage gear 540 with the intermediate gear 544 of the units order product wheel 13, the tens order with the tens order, etc.

When the last storage gear 540 containing a multiplier digit is counted back to zero in a program of multiplication, the operation of the machine normally is terminated without further shift of register carriage 2. Under certain conditions therefore, for example, if a multiplier digit is stored only in the rightmost storage device, normally no carriage shift would be effected as an incident to the multiplying operation. As a result, subcarriage 525 would be blocked by lock lever 556 from leftward adjustment in main carriage 2. Accordingly, provision is made so that, at the conclusion of a multiplying operation, carriage 2 will be shifted a distance to the right sufficient to prevent lock lever 556 from blocking movement of subcarriage 525 leftwardly within the main carriage to engage limit lug 525' with plunger 716. Such means comprises controls operable in accordance with the adjusted position of slide 712 to institute a shifting operation to locate main carriage 2 further toward the right should the last multiplier storage gear 540 be counted back to zero with said main carriage too far to the left to permit subcarriage 525 to be shifted leftwardly (Fig. 17) to the selected position for the transfer operation.

When a problem to be calculated includes a decimal, slide 712 is adjusted to the left on carriage 2 to the position in which finger 714 thereof is to the left of the number of orders of storage wheels 524 which will include the desired number of demicals to be transferred from the product register. For example, if two decimal places is considered sufficient for the calculation, slide 712 will be moved two places toward the left from its rightmost position as shown in Figure 16. Thus, finger 714 will be located to mark the decimal between the second and third storage wheels 524 from the right on subcarriage 525. Furthermore, when main carriage 2 is in its left end position for institution of a multiplying operation, finger 714 will be located to mark the decimal between the second and third columns of keys 18 on the right of the keyboard. As the decimal of the product is the sum of the decimals of the factors, a decimal marker 715 (Fig. 1) will be positioned between the fourth and fifth wheels 13 from the right of the product register. With slide 712 set as above described and carriage 2 in its left end position, a program of multiplication wherein both factors have two decimal places may be performed and the resulting product may be transferred to the multiplier storage devices as follows.

At the conclusion of registration of the product, subcarriage 525 may be adjusted toward the left in the main carriage to engage limit lug 525' with the end of plunger 716 as shown in Figure 17. It will be recalled that slide 712 is adjusted two places toward the left and therefore the subcarriage will be moved so that the rightmost storage gear 540 will be moved past the two rightmost intermediate gears 544 and finally into engagement with the third intermediate gear 544 from the right, and likewise the other storage gears will be moved beyond two intermediate gears and into engagement with the next intermediate gear to the left. When this adjustment of the subcarriage is effected, the two lowest order intermediate gears 544 will be to the right and out of engagement with storage gears 540. Therefore, if product wheels 13 are reset to zero, the values registered therein, exclusive of the two lowest orders, will be transferred to the successive lower order storage gears 540. Then if main carriage 2 is shifted to its left end position, subcarriage 525 will be restored to its normal latched position and finger 714 will correctly mark the decimal of the transferred product value.

*The program clutch*

Figure 8:
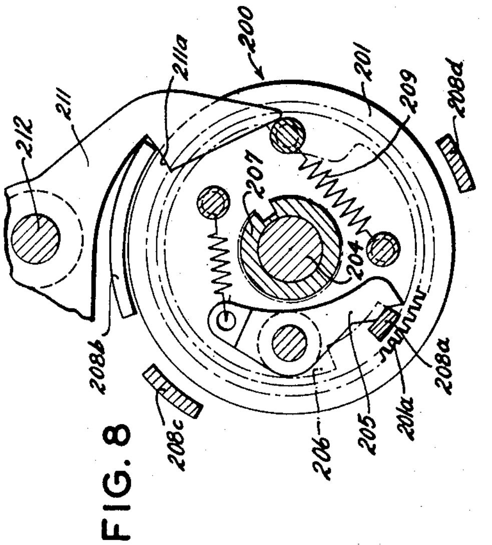
Fig. 8 is an enlarged side view of the multiphase clutch in normal disengaged position with parts broken away.
Figure 9:
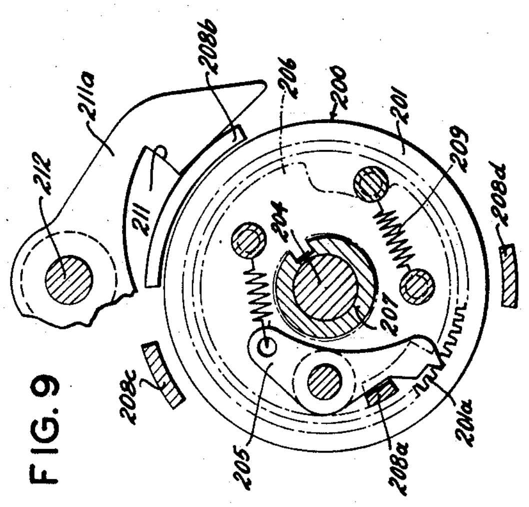
Fig. 9 is a fragmentary detail view showing the multiphase clutch engaged.

The control devices for the automatic operations which effect the product transfer and initiate the program of multiplication comprise a program clutch (Figs. 6, 7, 8 and 9). The program clutch is designated generally by the reference numeral 200. The driving member of clutch 200 comprises a cup shaped member 201 which is connected by a sleeve 202 with a gear 203 which is driven clockwise (Fig. 6) from the motor by a suitable gear train (not shown). A shaft 204 which extends between the side frames in the base of the machine (Figs. 3 and 5) provides means on which member 201, sleeve 202, and gear 203 are rotatably mounted as a unit. The cup shaped driving member 201 has an inner annulus of teeth 201*a* which are adapted for engagement by a pawl 205 which is mounted on the driven member of the clutch. The driven member of the clutch comprises a disk 206 which is integral with a sleeve 207 and positioned concentrically within the annulus of teeth 201*a*. Driven member 206 and sleeve 207 are rotatably mounted on shaft 204 and, as hereinafter described, are adapted to operate certain of the control devices of the invention. Pawl 205 is spring biased in clockwise direction on the inner face of driven member 206. Pawl 205 has a wedge shaped end which upon clockwise movement of said pawl will engage an adjacent tooth 201*a* thereby establishing a driving connection between members 201 and 206 as shown in Figure 9.

A clutch control member comprises a plate 208 which is rotatably mounted on sleeve 207 adjacent the outer face of disk 206. Extending leftwardly from plate 208 is a lug 208*a* which extends through a recess in the periphery of disk 206 and overlies pawl 205. A spring 209 is connected between disk 206 and plate 208 thereby biasing plate 208 clockwise with respect to disk 206. When plate 208 is moved clockwise by spring 209, lug 208*a* is removed from engagement with a cam surface of pawl 205 thereby permitting clockwise movement (Fig. 9) of said pawl to engage a tooth 201*a* thereby establishing a driving connection between the driving and the driven members of the clutch. As the driven member 206 is rotated in clockwise direction by driving member 201, plate 208 is likewise rotated by spring connection 209 which holds said plate clockwise with respect to disk 206 with lug 208*a* thereof engaged with the leading edge of the recess of said disk.

Figure 7:
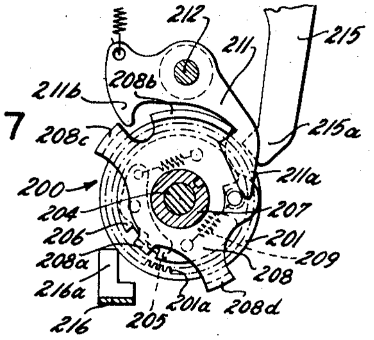
Fig. 7 is a side view of the multiphase clutch in normal disengaged position.

To disengage clutch 200 means are provided to arrest rotation of clutch control plate 208 as hereinafter described. When plate 208 is arrested from clockwise rotation, the cam surface of pawl 205 will be moved into engagement with lug 208*a* (Figs. 7 and 8). Engagement of the cam surface of pawl 205 with lug 208 will rock said pawl counterclockwise thereby removing it from engagement with the toothed annulus of driving member 201 thus disconnecting the drive to disk 206 which will be brought to rest by engagement of the following edge of its recess with lug 208*a*. It will be noted that clutch 200 is particularly adapted for multiphase operation because of its rapid engagement and disengagement respectively in response to release and arrest of control plate 208.

Figures 2, 4:
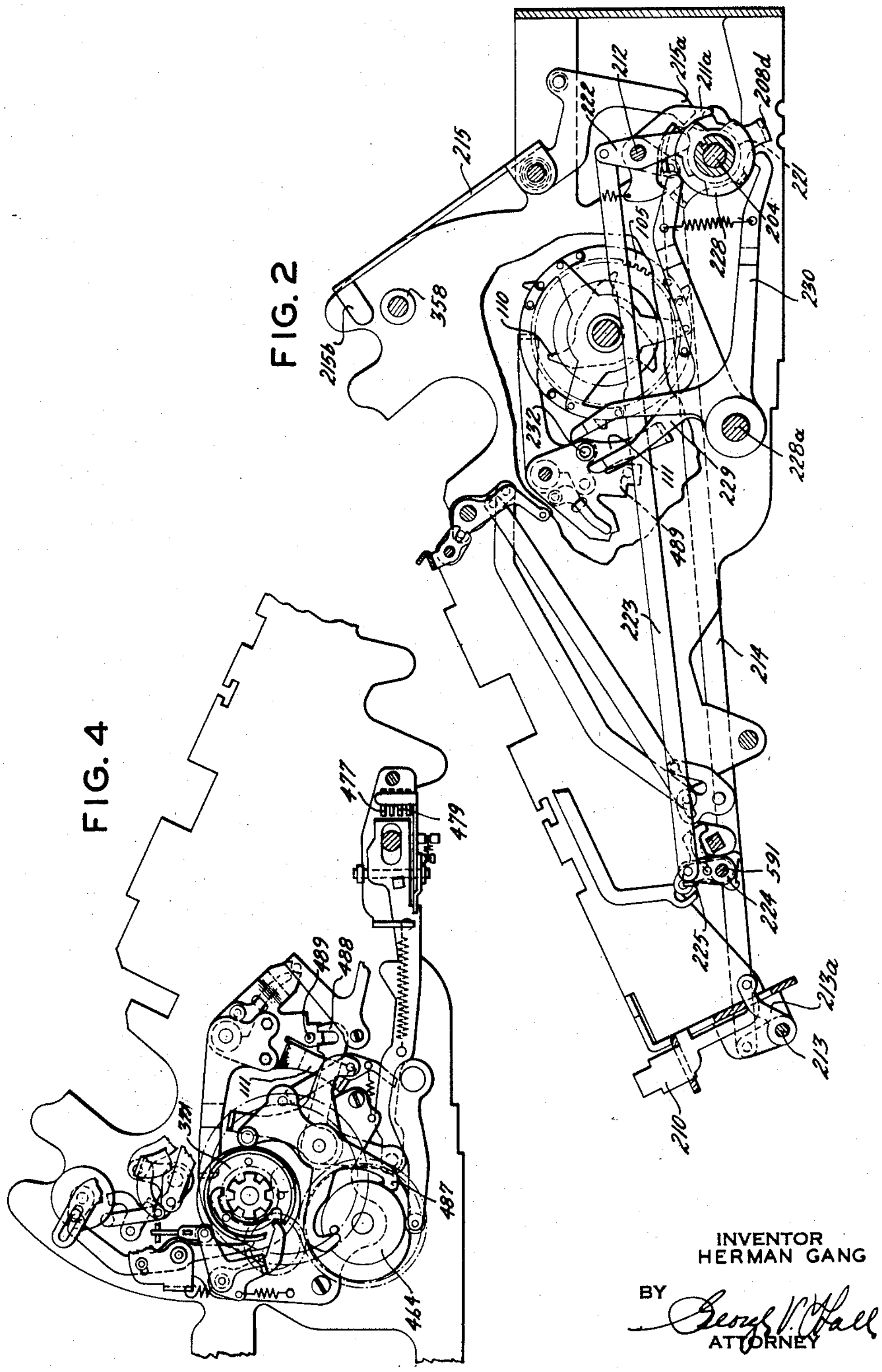
Fig. 2 is a vertical section of the machine looking toward the left side frame.
Fig. 4 is a fragmentary left side elevation showing the register resetting clutch and associated part.
Figure 3:
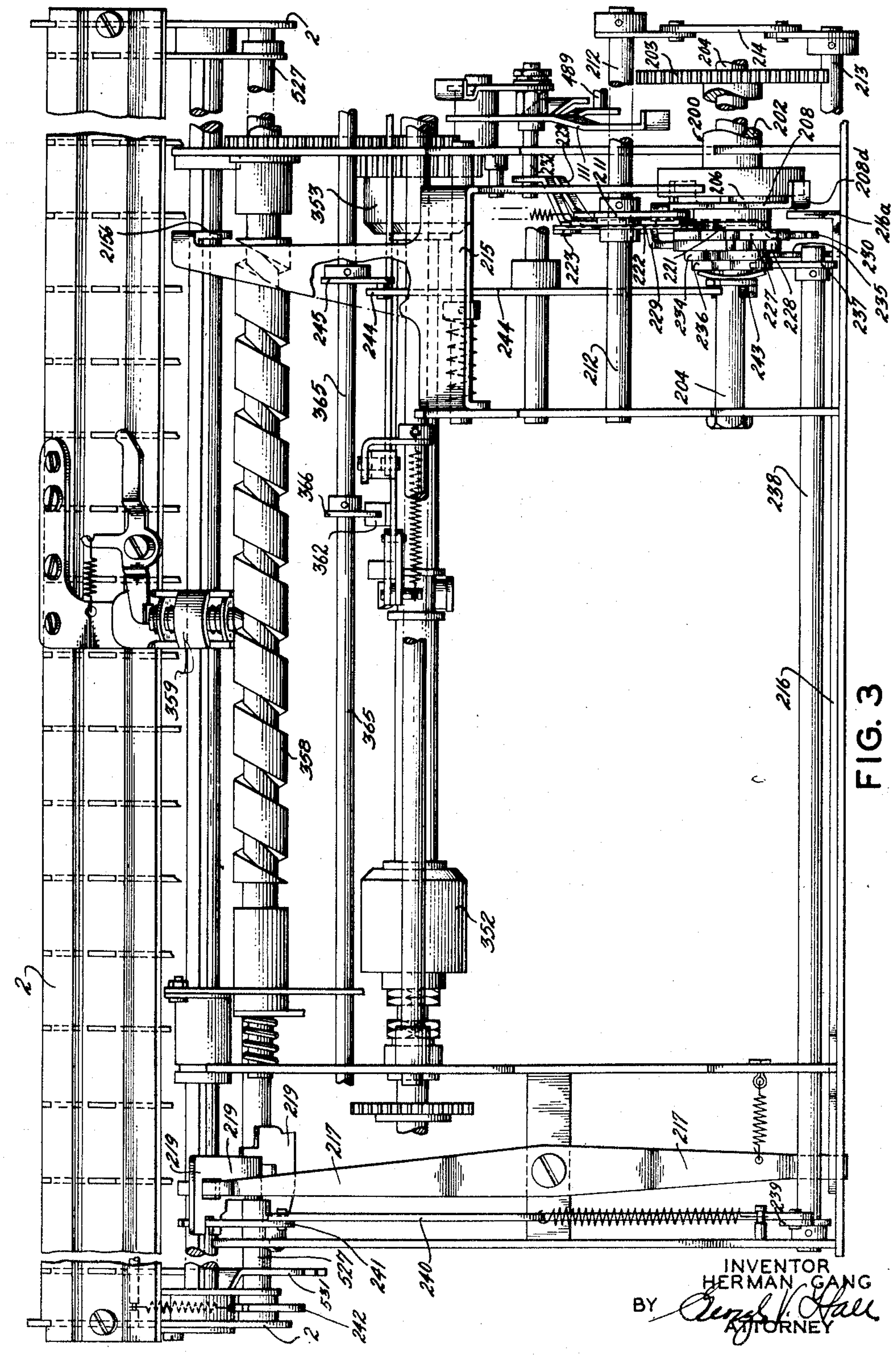
Fig. 3 is a rear view showing the carriage shifting mechanism and the control devices of the invention associated therewith.

In the embodiment of the invention hereinafter described, the program clutch is operated through four phases of operation in response to the single depression of a key 210 (Figs. 1, 2 and 6). Clutch 200 is normally held in full cycle disengaged position (Figs. 6, 7 and 8) by a detent 211 which is fixed on a rock shaft 212. Detent 211 and shaft 212 are normally spring urged clockwise with the end 211*a* of said detent engaging a lug 208*b* of control plate 208 to hold clutch 200 disengaged by blocking said plate from clockwise clutch engaging movement by spring 209. Upon depression of key 210 a shaft 213 will be rocked clockwise by an arm 213*a* to which the stem of the key is attached. Upon clockwise movement of shaft 212, a link 214 will be moved toward the rear of the machine thereby rocking shaft 212 and detent 211 counterclockwise to remove end 211*a* from engagement with lug 208*b* thereby permitting clockwise movement of plate 208 to engage clutch 200 as shown in Figure 9. As described in the following, clutch 200 is controlled through its successive phases of operation to control operation of the product transfer devices.

Figure 5:
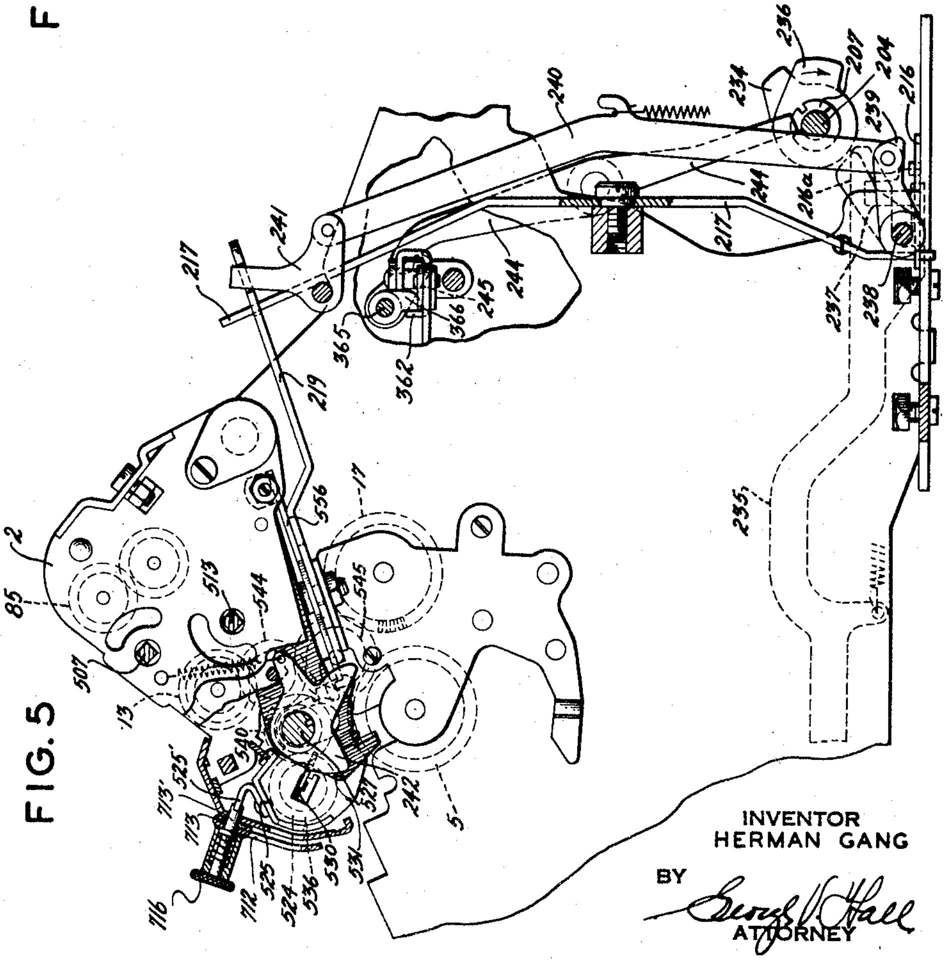
Fig. 5 is a fragmentary right side elevation with parts in section showing details of the control devices of the invention.

Means to control program clutch 200 in its phases of operation includes lugs 208*c* and 208*d* extending toward the left (Fig. 6) from clutch control plate 208. Lugs 208*c* and 208*d* are operable in conjunction with the end 215*a* of a yoke 215 (Figs. 2, 3 and 6) which has another arm 215*b* extending upwardly and adapted for engagement by plunger 359 of main carriage 2. Yoke 215 is spring biased toward the right (Fig. 6), toward the left (Fig. 3) and the end of its arm 215*a* is normally in the path of movement of lugs 208*c* and 208*d* of control clutch plate 208. Lug 208*b* which is hereinbefore described in connection with detent 211 is also operable in connection with a lug 216*a* of a slide 216. Slide 216 extends transversely across the machine and at its right end is recessed for engagement with the lower end of an upwardly extended lever 217 (Figs. 5 and 6). The upper end of lever 217 engages a slot at the rear of slide 219 and this slot permits forward adjustment of said slide relative to the end of said lever as hereinafter described. Slide 219 has pin and slot mounting at its forward end on a suitable bracket which is attached to the upper right side frame of the machine. Slide 219 is therefore adapted for forward and rearward sliding adjustment and also for pivotal movement on its slot and pin mounting. Normally lever 217 is spring urged to clockwise position (Fig. 6) to hold slide 219 in clockwise position on its pin and slot pivotal mounting. Slide 216 is normally spring held in leftward position( Fig. 6) thereby locating lug 216*a* in the path of movement of lug 208*b* of control plate 208.

Upon operation of clutch 200 when engaged by depression of key 210, lug 208*c* is adapted to engage arm 215*a* thereby interrupting operation of clutch 200 at the end of its first phase of operation. As will be hereinafter described, this interruption of the operation of clutch 200 is effected only if main carriage 2 is out of its left end position. Movement of carriage 2 into its left end position is operable to engage plunger 359 with arm 215*b* thereby moving yoke 215 toward the left (Fig. 6) and disengaging arm 215*a* from lug 208*c* of control plate 208 to reengage clutch 200 for its second phase of operation. It will be observed that if main carriage 2 is in its left end position upon initial operation of clutch 200, yoke 215 will be held in leftward position against the bias of its spring, and arm 215*a* will therefore be out of the path of movement of lug 208*c*. In this instance therefore the operation of clutch 200 will not be interrupted at the end of its first phase of operation but will continue through its second phase of operation. The second phase of operation of clutch 200 will be terminated by engagement of lug 208*b* of control plate 208 with lug 216*a* of slide 216.

The third phase of operation of clutch 200 will be initiated upon movement of main carriage 2 toward the right to a position where plunger 716 of slide 712 on said main carriage will engage lug 525' of subcarriage 525 as shown in Figure 17 thereby urging said subcarriage toward the right against the restraint of the forward left side edge of slide 219. As will hereinafter be described, at this time slide 219 will be in forward adjusted position to block movement of the subcarriage toward the right. When subcarriage 525 is urged against slide 219 said slide will be moved in counterclockwise (Fig. 6) direction thereby rocking lever 217 counterclockwise and moving slide 216 toward the right. Upon rightward movement of slide 216, lug 216a thereof will be removed from engagement with lug 208b thereby engaging clutch 200 for its third phase of operation. The third phase of operation of clutch 200 will be terminated by engagement of lug 208d with arm 215a of yoke 215.

The fourth phase of operation of clutch 200 will be initiated upon movement of main carriage 2 into its left end position to remove 215a from engagement with lug 208d in the same manner as was described in connection with lug 208c. The last and final phase of operation of clutch 200 will be terminated upon engagement of lug 208b of control plate 208 with end 211a of detent 211. If, however, the operator should hold key 210 depressed until the last phase of operation of clutch 200 has been initiated, a nose 211b of detent 211 will be in the path of movement of lug 208b. The operation of the clutch therefore will be interrupted intermediate its fourth and final phase until release of key 210 to permit detent 211 to be restored to its normal clutch disengaging position.

*The automatic program devices*

The program devices operated by clutch 200 include a cluster of cam members keyed on sleeve 207 to the right (Fig. 6) to the left (Fig. 3) of the driven member 206 of said clutch. The cam members and their operations will now be described with reference to the cams from left to right as viewed in the exploded perspective (Fig. 6) and not according to the sequence of the operations performed thereby. In the drawings the parts are shown in full cycle position and reference is made to timing chart (Fig. 18) wherein the phases of operation of clutch 200 are indicated and the time relation of the occurrence of the operations performed by the cams. It will be understood, however, that considerable latitude may be exercised in the timing of the operations.

Figure 10:
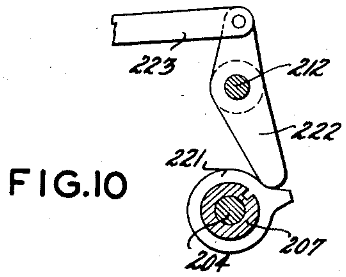
Fig. 10 is a side view of the multiplication initiating cam.

The first cam to the right of program clutch 200 is cam 221 (Fig. 10) which will hereinafter be termed the multiplication initiating cam. This cam comprises a low and a high portion. Normally the low portion of the cam is engaged by the depending arm of a lever 222 (Fig. 6). The upper end of lever 222 has link connection 223 with a crank 224 on shaft 591 which, it will be recalled, is rocked to initiate a program of multiplication. Crank 224 is loose on shaft 591 so that said shaft may be rocked independently of said crank by manually operable means to initiate a multiplying operation. Crank 224, however, engages a lug on a collar 225 which is fixed on shaft 591 so that upon counterclockwise movement it will be effective to rock said shaft. During the fourth phase of operation of clutch 200, the high portion of cam 221 will be moved into and beyond the end of lever 222 as the clutch completes its cycle of operation. Lever 222 therefore will be rocked momentarily counterclockwise against the tension of normalizing spring means to move link 223 toward the front of the machine. Link 223 will rock crank 224 which by engagement with the lug of collar 225 will rock shaft 591 counterclockwise to initiate the program of multiplication.

Figure 11:
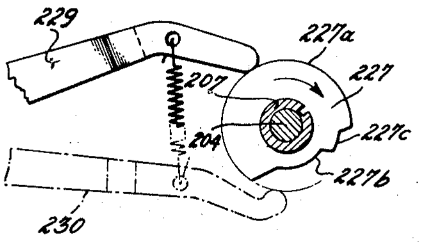
Fig. 11 is a side view of one of the complemental shift main drive control cams.
Figure 12:
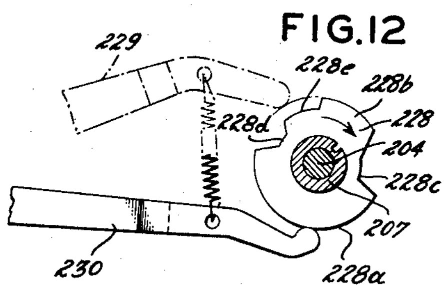
Fig. 12 is a side view of the other complemental shift main drive control cams.

To the right of cam 221 is a pair of complementary operable cams 227 and 228. These cams are illustrated in Figures 11 and 12 respectively and will hereinafter be termed the shift main drive control cams because they control operation of clutch lever 111 of the machine main drive transmission. These cams are operable to control operation of a pair of scissors comprising cranks 229 and 230 respectively. Cam 227 comprises high portion 227a, low portion 227b and intermediate portion 227c. Normally the end of the rearwardly extending arm of a scissor crank 229 is spring biased clockwise into engagement with the high portion 227a of cam 227. Cam 228 comprises a pair of high portions 228a and 228b, a pair of low portions 228c and 228d, and an intermediate portion 228e. Normally the end of the rearwardly extending arm of a scissor crank 230 is spring biased counterclockwise into engagement with high portion 228a. When cranks 229 and 230 are in normal position their upwardly extending arms are positioned equidistantly respectively to the left and to the right of a pin 232 extending inwardly from clutch lever 111. Thus, clutch lever 111 is permitted movement to and from its active positions without interference by engagement with scissor cranks 229 and 230.

During the first phase of operation of program clutch 200, cam 228 will be moved to engage its low portion 228c with the end of the arm of crank 230. This will permit crank 230 to be spring moved in counterclockwise direction thereby engaging pin 232 and moving clutch lever 111 clockwise (Fig. 2) to engage the machine drive for a left carriage shift operation. At this time the rearward arm of crank 229 will remain in engagement with the high portion of 227a of cam 227 and will therefore not interfere with the adjustment of clutch lever 111.

During the second phase of operation of clutch 200 the high portion 228b of cam 228 will be moved into engagement with crank 230 thereby restoring said crank clockwise to normal position. During this phase of operation of the clutch, the low portion 227b of cam 227 will be moved into engagement with crank 229 thereby permitting said crank to be spring moved clockwise to engage pin 232 and move clutch lever 111 counterclockwise (Fig. 2) to engage the machine drive for a right shift operation.

During the third phase of operation of clutch 200, cams 227 and 228 will effect two successive adjustments of cranks 229 and 230. First, the intermediate portion 227c of cam 227 will be moved into engagement with crank 229 and the intermediate portion 228e of cam 228 will be moved into engagement with crank 230. This will effect counterclockwise movement of crank 229 and will permit counterclockwise movement of crank 230 by its spring. This operation will move the upstanding arms of said cranks to effect a scissor like engagement with pin 232 thereby moving clutch lever 111 to intermediate position thus disengaging the carriage shift drive. The second adjustment of clutch lever 111 will be effected upon further operation of clutch 200 in its third phase during which the high portion 227a of cam 227 will be moved into engagement with crank 229 and the low portion 228d of cam 228 will be moved into engagement with crank 230. This operation will move clutch lever 111 clockwise (Fig. 2) to engage the machine drive for a left shift operation.

During the fourth and final phase of operation of clutch 200 the high portion 227a of cam 227 will remain in engagement with crank 229 and the high portion 228a of cam 228 will again be moved into engagement with crank 230. The cranks will therefore be restored to normal position to permit independent adjustment of clutch lever 111.

Figure 13:
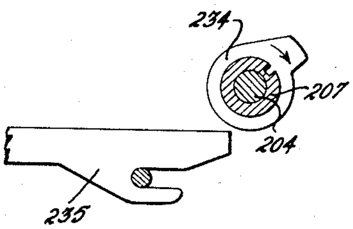
Fig. 13 is a side view of the zero resetting control cam.

To the right of cam 228 is cam 234 (Fig. 13) which will be hereinafter termed the zero resetting control cam. This cam has a high portion and a low portion and is adapted for operation in connection with a slide 235 (Fig. 6). Slide 235 extends toward the front of the machine and is normally spring urged rearwardly. The front edge of slide 235 normally is positioned a slight distance to the rear of a cam edge at the rear of each of slides 477 and 479 which as hereinbefore described are operable to engage zero setting clutch 464 and to select the operations performed by the clutch.

During the second phase of operation of clutch 200 the high portion of cam 234 will engage the rear end of slide 235 thereby moving said slide toward the front of the machine. Upon forward movement of slide 235, the front end of said slide will engage the cam edges of slides 477 and 479 thereby camming said slides toward the left to engage resetting clutch 464. The operation of the clutch, however, as will be hereinafter described is held in abeyance. During the third phase of operation of clutch 200 the high portion of cam 234 will be moved beyond the end of the slide 235 thereby permitting the parts to be restored.

Figure 14:
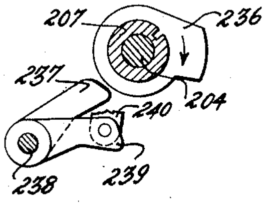
Fig. 14 is a side view of the sub-carriage control cam.

To the right of cam 234 is a cam 236 (Fig. 14) also having a high and a low portion. This cam will hereinafter be termed the subcarriage control cam. Cam 236 is adapted for operation in connection with a crank 237 which is fixed on a rock shaft 238 (Figs. 5 and 6). A second crank 239 is fixed at the right end of shaft 238 and a link 240 is pivotally attached at its lower end to said crank. Link 240 extends upwardly and is pivotally attached at its upper end to the horizontally disposed arm of a bell crank 241. The other arm of the bell crank engages a recess at the rear end of the forwardly extending slide 219 which is hereinbefore described in connection with slide 216 and lever 217 in the control of program clutch 200. The forward end of slide 219 is positioned a slight distance to the rear of a depending arm of a latch release crank 242 when the main carriage 2 is in its left end position. Crank 242 is rotatably mounted on shaft 527 on which subcarriage 525 is slidably mounted in main carriage 2. Crank 242 is normally spring biased counterclockwise as shown in Figure 5 and a forwardly extending arm thereof underlies the end of latch 530 which normally engages plate 531 (Fig. 16) to maintain subcarriage 525 in normal fixed relation with main carriage 2.

During the second phase of operation of clutch 200, the high portion of cam 236 will engage crank 242 thereby rocking said crank and shaft 238 counterclockwise. Counterclockwise movement of shaft 238 will raise link 240 upwardly through crank 239. Upward movement of link 240 will rock bell crank 241 counterclockwise thereby moving slide 219 toward the front of the machine. Upon forward movement of slide 219, its front end will engage the depending arm of release crank 242 thereby rocking said crank clockwise and releasing subcarriage latch 530. Furthermore, upon forward movement of slide 219 its left side edge will be brought into engagement with the outer face of the right end plate of subcarriage 525. From the above it will be seen that main carriage 2 may be shifted toward the right independently of subcarriage 525 which will be restrained from movement therewith by blocking slide 219 as shown in Figure 17. As hereinbefore described, pivotal movement of slide 219 is adapted to perform certain functions in the program of operations. During the third phase of operation of clutch 200, the high portion of cam 236 will be moved from engagement with arm 237 and the adjusted parts will be spring restored to normal position.

Figure 15:
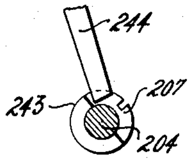
Fig. 15 is a side view of the shift secondary drive control cam.

The rightmost cam 243 (Fig. 15) of the cluster has a high and a low portion. This cam will hereinafter be termed the shift secondary drive control cam because it controls shift friction clutch 353 which completes the shift drive with the main machine drive transmission. Cam 243 is formed by cutting away an arcuate section at the right end (Fig. 6) of sleeve 207. Thus, the exposed arcuate face of shaft 204 on which sleeve 207 is mounted comprises the low portion of the cam and the retained face of sleeve 207 comprises the high portion.

The lower end of the depending arm of a vertically disposed lever 244 is normally engaged by the low portion of cam 243. The end of the upstanding arm of said lever 244 engages a pin on a crank 245 which is fixed on shaft 365 on which finger 366 is fixed. Upon clockwise rotation of cam 243 the high portion thereof will engage lever 244 thereby rocking said lever counterclockwise and crank 245, shaft 365, and finger 366 clockwise. As hereinbefore described, clockwise movement of finger 366 will break toggle 362 thereby engaging shift friction clutch 353 and disengaging registration friction clutch 352. This operation will be effected during the first phase of operation of program clutch 200 and the high portion of cam 243 will be engaged with lever 244 through the third phase of operation of said clutch. During the fourth phase of operation of clutch 200, the low portion of cam 243 will again be engaged with lever 244 thereby permitting shaft 365 and finger 366 to be restored counterclockwise. Counterclockwise movement of shaft 365 will engage auxiliary shift control clutch 371 to complete its cycle of operation thereby resetting toggle 362 which will disengage shift friction clutch 353 and reengage registration shift clutch 352. Furthermore, operation of auxiliary clutch 371 will move clutch lever 111 to neutral position thereby disengaging the machine drive.

*The program of operations*

The sequence of operations incidental to the product transfer and initiation of the program of multiplication which are automatically effected by the control devices of the invention in response to operation of program clutch 200 are briefly outlined as follows.

If main carriage 2 is out of the left end position, the first phase of operation of program clutch 200 will initiate a left carriage shift. The carriage shift will be terminated in the left end position whereupon the second phase of operation of the clutch will be initiated. If, however, the register carriage is in its left end position the clutch will operate through its first and second phases without interruption. The second phase of operation of the clutch adjusts devices which unlatch subcarriage 525 from main carriage 2, block the subcarriage from shifting movement with the main carriage and initiate a right shift of said main carriage. Furthermore, detent 487 is released to engage zero setting clutch 464; however its operation to engage the clutch is held in abeyance. The right carriage shift will be terminated with the main carriage and subcarriage in relative shifted position for the transfer operation and thereupon the program clutch will be engaged for its third phase of operation. The third phase of operation of the clutch will permit operation of the previously conditioned resetting clutch 464 to effect the product transfer and will initiate a left shift of the main carriage. The carriage shift will be terminated in the left end position whereupon the subcarriage 525 will be latched in its normal position relative to the main carriage and the fourth phase of the program clutch will be instituted. The fourth phase of the clutch will effect certain normalizing operations and will initiate the program of multiplication.

It will be assumed that a program of multiplication has been concluded thereby registering a product in wheels 13 (Figs. 1 and 5) of the product register, and that it is desired to transfer said product to multiplier storage wheels 524 and utilize the transfer value as a multiplier in a subsequent program of multiplication. The multiplier storage wheels 524 will have been counted back to zero in the multiplying operation and it will be assumed that carriage 2 is in the right shifted position wherein the program of multiplication was terminated. Furthermore, if the multiplier included a decimal value, slide 712 will have been manually adjusted toward the left from its normal position to properly indicate said decimal, and decimal marker 715 for the product will have been adjusted to its proper position with relation to product wheels 13. If, however, there were no decimal values in the factors of the problem of multiplication, slide 712 will have been retained adjusted in its normal rightmost position.

Figure 18:
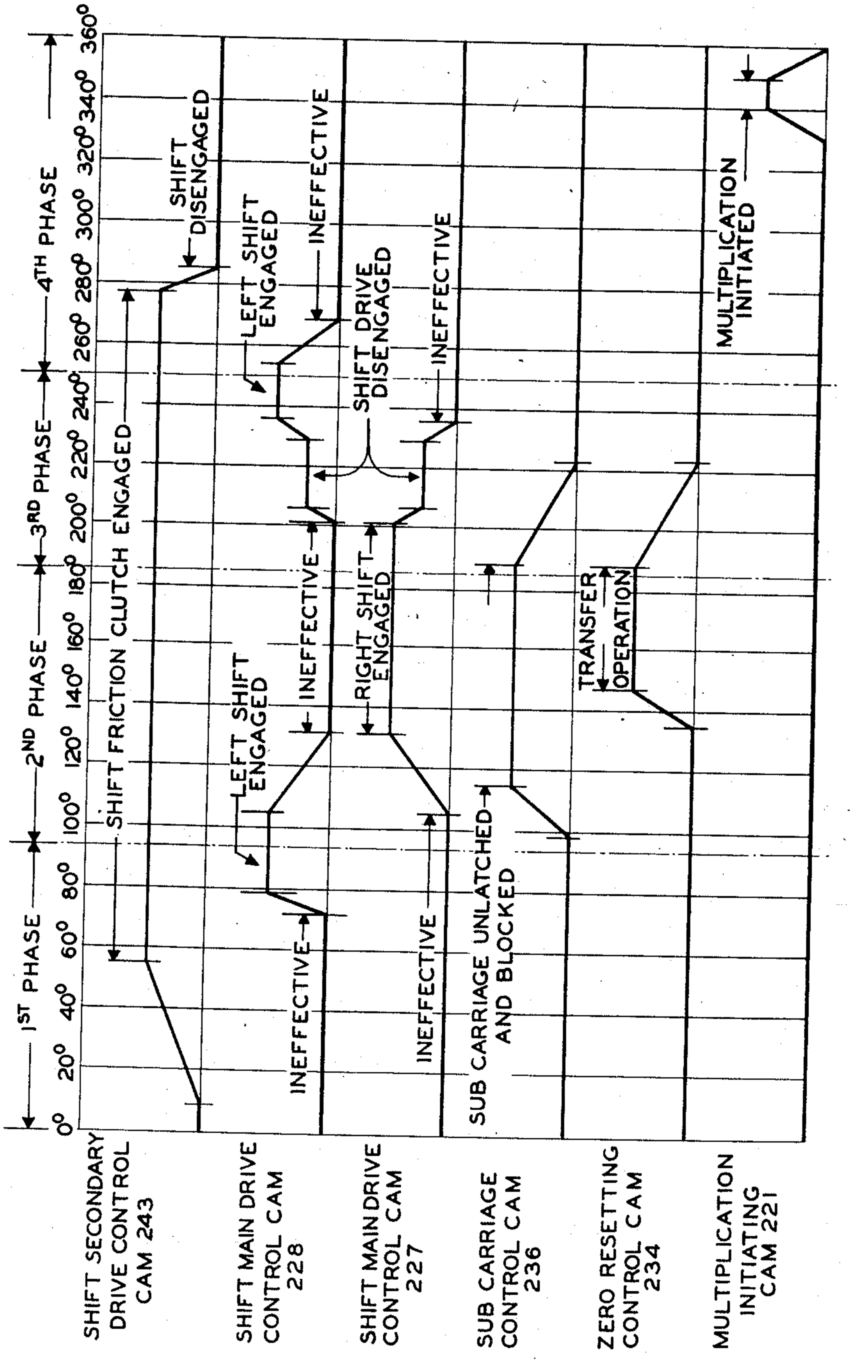
Fig. 18 is a timing chart illustrating the sequence of operations of the devices of the invention.

Reference is made to the timing chart of Figure 18 for the sequence of operations hereinafter described in connection with the successive phases of operation of clutch 200 (Figs. 6, 7, 8 and 9). Depression of key 210 will operate detent 211 to initiate operation of program clutch 200 for its first phase of operation. The clutch will be arrested at the end of its first phase of operation by engagement of lug 208c of plate 208 with arm 215a of yoke 215. Near the beginning of the first phase of operation of clutch 200, shift secondary drive control cam 243 (Fig. 3) will operate lever 244 to rock shaft 365 and finger 366 thereby breaking toggle 362 to engage shift friction clutch 353 and to disengage registration friction clutch 352. Near the end of the first phase of operation of clutch 200 and low portion 228c of shift main drive control cam 228 will be brought into engagement with scissor crank 230. However, the high portion 227a of shift main drive control cam 227 will remain in engagement with scissor crank 229. This operation will move clutch lever 111 to engage the machine drive for a left carriage shift, the power for which will be transmitted through engaged friction clutch 353.

Upon movement of main carriage 2 into its left end position, engagement of plunger 359 thereof with arm 215b of yoke 215 will release clutch control plate 208 to initiate the second phase of operation of clutch 200. It will be noted that shift friction clutch 353 remains engaged until the conclusion of the final shifting operation in the program, and that the carriage shifting operations are controlled by clutch lever 111 through the main drive transmission. Furthermore, it will be noted that upon movement of the carriage into the left end position, the left shift drive by the main drive transmission will not be immediately disengaged but that the disengagement is effected during the second phase of operation of clutch 200. This, however, is of no consequence as the carriage shift mechanism provides an ineffective drive arrangement to permit operation with the carriage in an end position. Furthermore, if such arrangement were not provided, friction shift clutch 353 would prevent jamming of the mechanism pending disengagement of the main machine drive.

Near the beginning of the second phase subcarriage control cam 236 will rock crank 237 and shaft 238 to move slide 219 forwardly thereby releasing latch 530 which connects subcarriage 525 and main carriage 2 and blocking said subcarriage from shifting movement toward the right. Further in the second phase of operation high portion 228b of cam 228 will be moved into engagement with lever 230 and the low portion 227b of cam 227 will be moved into engagement with crank 229. This operation will move clutch lever 111 to engage the machine drive for a right shift operation of main carriage 2. Shortly after this operation to adjust lever 111 for a right carriage shift during the second phase of operation of clutch 200, cam 234 will move slide 235 toward the front of the machine thereby releasing clutch detent 487 to engage zero setting clutch 464. However, the operation of this clutch will be held in abeyance by the interlock means comprising arm 488.

With the parts in the above adjusted position, main carriage 2 will be shifted toward the right and subcarriage 525 will be restrained from like shifting movement by slide 219. Thus, a relative adjustment will be effected between intermediate gears 544 of product wheels 13 and the multiplier storage gears 540. If slide 712 is in its rightmost non-decimal indicating position, plunger 716 will engage lug 525' of subcarriage 525 intermediate the first denominational shift toward the right of main carriage 2. When this engagement of plunger 716 and lug 525' is effected, the units order intermediate gear 544 will be meshed with the units order storage gear 540, the tens order with the tens order, etc. If, however, slide 712 has been adjusted to a decimal indicating position, a predetermined number of the lower order intermediate gears 544 of product wheels 13 will be to the right of and out of range of storage gears 540. Storage gears 540, therefore, will be meshed with a successive number of intermediate gears 544 to the left of the intermediate gears which are out of range of said storage gears. Furthermore, upon engagement of plunger 716 of main carriage 2 with lug 525' the subcarriage 525 will be urged toward the right with said main carriage in its shifting movement. Therefore, the subcarriage engaging the slide 219 will rock said slide counterclockwise thereby moving slide 216 toward the left to initiate the third phase of operation of program clutch 200. This third phase of operation will be terminated upon engagement of lug 208d of control plate 208 with arm 215a of yoke 215. It will be noted that at this time, the main carriage will be blocked from further movement toward the right while it is intermediate a denominational shifted position and at this time the right shift drive is engaged. However, a jam in the mechanism is prevented by momentary slippage of the shift friction clutch 353.

During the first part of the third phase of operation of clutch 200, the intermediate portion 228e of cam 228 will be moved into engagement with scissor crank 230 and simultaneously the intermediate portion 227c of cam 227 will be moved into engagement with the scissor crank 229. This operation will move clutch lever 111 to its neutral intermediate position thereby disengaging the carriage shift drive. Upon movement of clutch lever 111 to its intermediate position, the interlock devices 488, 489 between said clutch lever and zero setting clutch 464 will be moved from position to restrain clutch detent 487. Detent 487, which as will be recalled was released during the second phase of operation of clutch 200, will be moved to engage zero setting clutch 464. Upon movement of detent 487 to engage clutch 464, the forked end of interlock arm 488 will engage pin 489 of clutch lever 111 thereby locking said lever in neutral position until the end of operation of zero setting clutch 464. Operation of zero setting clutch 464 will rotate product wheels 13 to zero registering position thereby transferring the value therein to multiplier storage wheels 525. However, before zero setting clutch 464 has finished its cycle of operation, the third phase of operation of program clutch 200 will have been completed. Near the end of this third phase of operation the low portion 228d of cam 228 will be moved to engage crank 230 and the high portion 227a of cam 227 will be moved to engage crank 229. Crank 230 will therefore be permitted counterclockwise movement by cam 228 to move clutch lever 111 to engage the machine drive for a left carriage shift. However, at this time the spring of crank 230 will be ineffective to rock said crank because clutch lever 111 is held in neutral position by interlock arm 488 under control of clutch detent 487 of zero setting clutch 464. Upon completion of the cycle of operation of clutch 464 detent 487 will be restored to clutch disengaging position thereby releasing clutch lever 111 from the restraint of the interlock arm 488. Upon release of the clutch lever, crank 230 will be moved counterclockwise by its spring to move said clutch lever to engage the carriage left shift drive. Furthermore, during the third phase of operation of clutch 200, cams 234 and 236 will be removed from engagement with slide 235 and crank 237 respectively to allow the parts entrained therewith to be restored to normal.

As hereinbefore noted it will be recalled that during the three successive phases of operation of program clutch 200, lever 244 has been held in rocked position by the high portion of cam 243 thereby maintaining the friction shift clutch 353 in engagement; and therefore the control of the carriage shifting mechanism is effected by control of clutch lever 111 of the main machine drive by complemental cams 227 and 228. Furthermore, it will be noted that upon termination of the successive carriage shifting operations heretofore described, it has been unnecessary to terminate said operations with the shifting mechanisms in full cycle position. This is permitted because, as hereinbefore noted, when the main carriage is shifted to an end position, the shifting mechanism may be idly operated without further shift in that direction; and when the carriage is arrested from shifting movement by slide 219 intermediate a denominational shifted position, the friction shift clutch 353 will permit momentary continued operation of the shift drive means until clutch lever 111 has been moved to neutral position to disconnect said drive.

Main carriage 2 will be shifted toward the left until it reaches the left end position whereat it will again engage arm 215*b* to move yoke 215 toward the left thereby disengaging arm 215*a* from lug 208*d* to initiate the fourth phase of operation of clutch 200. At the beginning of this phase of operation the high portion 228*a* of cam 228 will be moved into engagement with crank 230 thereby moving said crank to normal position. During this phase of operation the high portion 227*a* of cam 227 will remain in engagement with crank 229. Therefore, clutch lever 111 will be freed for movement to neutral position. Shortly after this operation the high portion of cam 243 will be removed from engagement with lever 244. This will permit shaft 365 and finger 366 to be restored thereby initiating the normalizing operation of auxiliary clutch 371 to locate the carriage shifting mechanism in full cycle position, to disengage shift friction clutch 353 and reengage registration friction clutch 352, and to move clutch lever 111 to neutral position thereby disconnecting the machine drive. Following this operation and near the end of the fourth and final phase of operation of clutch 200 the high portion of cam 221 will engage and then pass beyond the lower end of lever 222 thereby rocking said lever counterclockwise. Counterclockwise movement of lever 222 through link 223 and crank 224 will rock shaft 591 to initiate a program of multiplication utilizing the transferred product value as a multiplier.

Although the control devices of the invention are disclosed as adapted for operation in conjunction with mechanisms of a calculating machine having particular operating characteristics, it will be obvious that the invention is readily adaptable to other types of calculating machines. It is understood, therefore, that the invention is capable of modification without departing from the scope of the appended claims.

I claim:

1. In a motor driven calculating machine having a product register including a denominational series of numeral wheel gears, and resetting means operable to rotate said product wheels to zero registering position; mechanism for performing a program of multiplication including a denominational series of multiplier storage gears shiftable into and out of mesh with said product gears, means for locating said storage gears in a normal position out of mesh with said product gears, program devices sequentially operable to adjust said storage gears into mesh with said product gears, to initiate operation of said resetting means thereby causing transfer of a register value to the storage gears, and to restore said storage gears to said normal position; a program clutch operable through a plurality of phases to control operation of said program devices, means operable to control engagement and disengagement of said program clutch, a key for actuating said clutch control means to effect initial engagement of said clutch for the aforesaid phases of operation, and means operable in response to operation of said program devices to effect operation of said clutch control means to control the successive phases of operation of said clutch subsequent to its initial engagement.

2. The invention according to claim 1 wherein the program devices are operable to initiate a program of multiplication subsequent to restoring of the multiplier storage gears to normal position.

3. In a motor driven calculating machine having a product register including a denominational series of numeral wheel gears, resetting means operable to rotate said product wheels to zero registering position, and a denominational series of multiplier storage gears; the combination with a carriage for effecting denominational shift between said product gears and said storage gears to mesh said storage gears with selected denominational orders of said product gears, means for locating said carriage to position said product and storage gears in a normal unmeshed position, and reversibly operable mechanism for shifting said carriage, of program devices sequentially operable to initiate operation of said carriage shifting mechanism, to terminate operation of said shifting mechanism upon movement of said carriage into a selected position wherein said storage gears will be in mesh with the product gears of selected denominational orders, to initiate operation of said resetting mechanism, to initiate operation of said carriage shifting mechanism in the reverse direction to restore said gears to normal position, and for terminating operation of said shifting mechanism upon movement of said gears to normal position, a program clutch operable through a plurality of phases to control operation of said program devices, means operable to control engagement and disengagement of said program clutch, a key for actuating said clutch control means to effect initial engagement of said clutch for the aforesaid phases of operation, and means operable in response to operation of said program devices to effect operation of said clutch control means to control the successive phases of operation of said clutch subsequent to its initial engagement.

4. The invention according to claim 3 wherein the means operable in response to operation of the program devices to effect operation of the clutch control means to control operation of the program clutch subsequent to its initial engagement, comprises means operable in response to movement of said carriage into the respective positions incidental to the operation of said program devices.

5. In a motor driven calculating machine having a fixed frame, a main carriage mounted and transversely shiftable relative to said frame, reversibly operable mechanism for shifting said carriage, a product register on said carriage including a denominational series of numeral wheel gears, and resetting means operable to rotate said product wheels to zero registering position; a subcarriage mounted on and longitudinally shiftable relative to said main carriage, a denominational series of multiplier storage gears on said subcarriage, a latch for locating said subcarriage in a normal position on said main carriage with said multiplier storage gears out of mesh with said product gears, means for releasing said latch to permit relative shifting movement between said main and subcarriages, a member adjustable to block said subcarriage from shifting movement with said main carriage, and motor operated control devices sequentially operable to release said latch and to adjust said blocking member to effective position, to initiate operation of said main carriage shifting mechanism in a given direction, to terminate operation of said carriage shifting mechanism upon movement of said main carriage into a selected position wherein the product gears of selected denominational orders will be in mesh with the multiplier storage gears, to initiate operation of said resetting means thereby causing transfer of registered values to said storage gears, to initiate operation of said carriage shifting mechanism in the reverse direction, and to terminate operation of said carriage shifting mechanism upon movement of said main carriage into its initial position in normal relation with said subcarriage.

6. In a motor driven calculating machine having a fixed frame, a main carriage mounted on and transversely shiftable relative to said frame, reversibly operable mechanism for shifting said carriage, a product register on said carriage including a denominational series of numeral wheel gears, and resetting means operable to rotate said product wheels to zero registering position; a subcarriage mounted on and longitudinally shiftable relative to said main carriage, a denominational series of multiplier storage gears on said subcarriage, a latch for locating said subcarriage in a normal position on said main carriage with said multiplier storage gears out of mesh with said product gears, means for releasing said latch when said main carriage is in a given position to permit relative shifting movement between said main and subcarriages, a member adjustable to block said subcarriage from shifting movement with said main carriage when said main carriage is in said given position, and motor operated control devices sequentially operable to initiate operation of said carriage shifting mechanism in a given direction when said main carriage is out of said given position, to terminate operation of said carriage shifting mechanism upon movement of said main carriage into said given position, to release said latch and to adjust said blocking member to effective position, to initiate operation of said carriage shifting mechanism in the reverse direction, to terminate operation of said carriage shifting mechanism upon movement of said main carriage into a selected position wherein the product gears of selected denominational orders will be in mesh with the multiplier storage gears, to initiate operation of said resetting means thereby causing transfer of registered values to said storage gears, to initiate operation of said carriage shifting mechanism in said given direction, and to terminate operation of said carriage shifting mechanism upon movement of said main carriage into said given position.

References Cited in the file of this patent

UNITED STATES PATENTS

| | | |
|---|---|---|
| 2,382,661 | Pott | Aug. 14, 1945 |
| 2,399,170 | Chase | Apr. 30, 1946 |
| 2,531,207 | Gang | Nov. 21, 1950 |
| 2,531,208 | Gang | Nov. 21, 1950 |
| 2,572,921 | Gang | Oct. 30, 1951 |
| 2,828,913 | Ellerbeck | Apr. 1, 1958 |

FOREIGN PATENTS

| | | |
|---|---|---|
| 337,607 | Great Britain | Nov. 6, 1930 |
| 203,473 | Switzerland | June 16, 1939 |